United States Patent [19]

Slosberg et al.

[11] Patent Number: 4,702,950

[45] Date of Patent: Oct. 27, 1987

[54] BITUMEN BACKED CARPET TILE AND METHOD OF PRODUCTION

[75] Inventors: David K. Slosberg, Atlanta; David S. Reece, Rome, both of Ga.; Johannes A. H. Claessen, Leusden, Netherlands

[73] Assignee: Heuga Holding bv, Scherpenzeel, Netherlands

[21] Appl. No.: 11,624

[22] Filed: Feb. 6, 1987

[51] Int. Cl.[4] .......................... B32B 3/02; B32B 33/00
[52] U.S. Cl. ....................................... 428/95; 156/247; 156/250; 156/289; 156/324; 156/334; 156/337; 428/96; 428/489; 428/97
[58] Field of Search ...................... 428/95, 96, 97, 489; 156/247, 250, 289, 324, 334, 337

[56] References Cited

U.S. PATENT DOCUMENTS 4,242,393 12/1980 Leupen .................................. 428/95
4,582,554 4/1986 Bell et al. ............................. 156/247

Primary Examiner—Marion C. McCamish
Attorney, Agent, or Firm—Richard P. Crowley

[57] ABSTRACT

A carpet tile and method of production wherein the carpet tile comprises a carpet tile having a fibrous face, such as a tufted face, and a fibrous back surface secured to a primary backing and comprising three separate hot melt coating composition layers and a secondary backing on the back surface of the carpet tile. The carpet tile is produced by coating a thick backing layer of a rubber-modified bitumen coating composition onto a secondary backing sheet material and separately coating a first precoat layer comprising a hot melt petroleum resin or bitumen and a second layer comprising a hot melt bitumen composition containing a flexible vinyl adhesive resin, like ethylene vinyl acetate, onto a fibrous back surface of a carpet material having a primary backing sheet containing a fibrous face wear surface and laminating the surface of the second layer to the surface of the backing layer to provide a carpet tile having dimensional stability, good lay flat characteristics and capable of production by an in-line production method.

29 Claims, 3 Drawing Figures

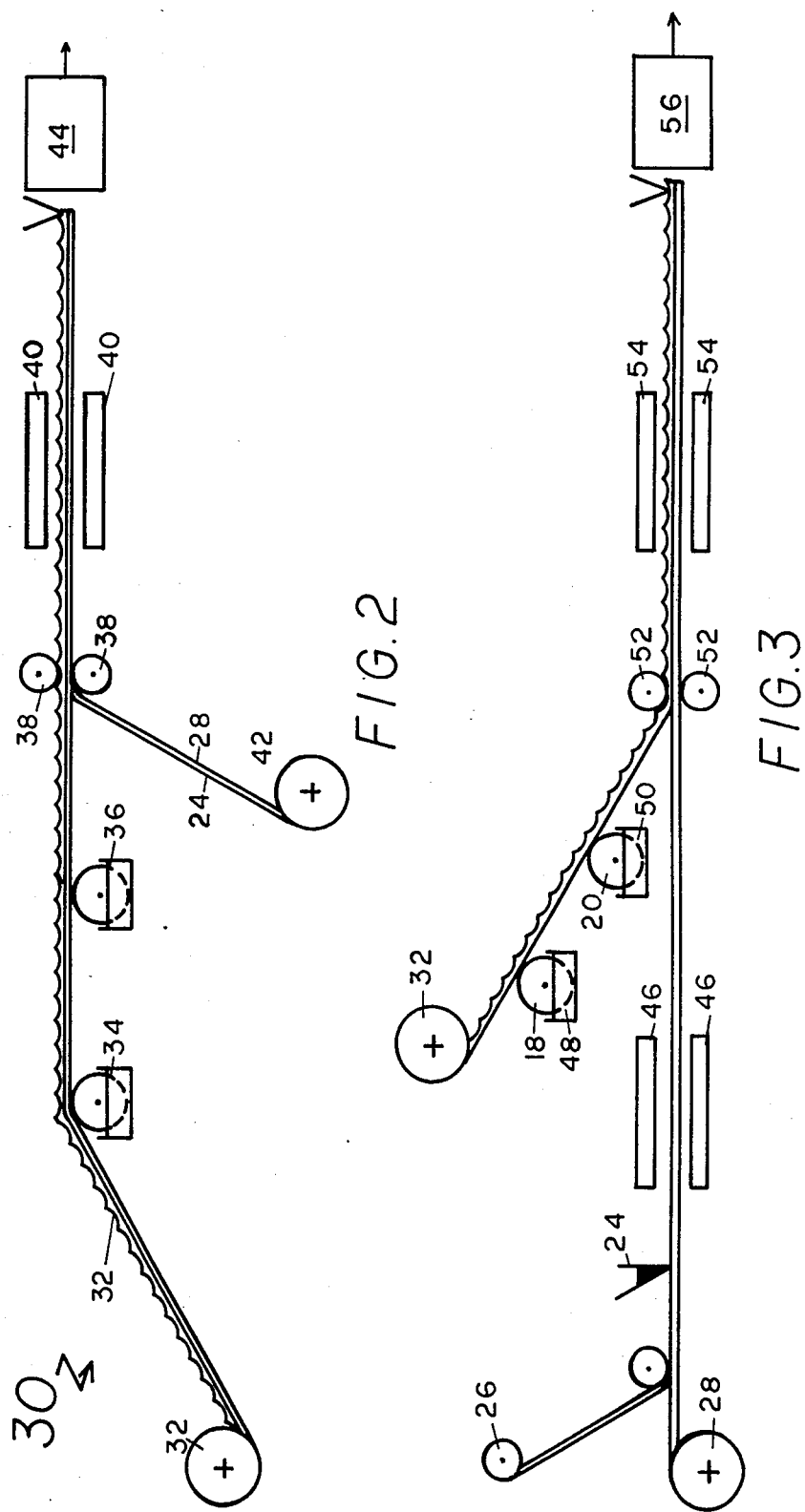

BITUMEN BACKED CARPET TILE AND METHOD OF PRODUCTION

BACKGROUND OF THE INVENTION

The carpet tile is typically produced by coating the back surface of a carpet material having a primary backing sheet having a fibrous wear surface with one or more coatings of a polymeric composition. The polymeric composition may contain one or two sheets of stabilizing sheet material, such as glass fiber material such as tissue or scrim, and may also contain a secondary backing sheet on the back surface of the carpet tile. Generally, carpet tile is produced by either back coating the primary backing sheet with a PVC plastisol composition or in a different technique with a hot melt composition, such as a bitumen or an atactic polypropylene or bitumen-modified hot melt compositions (see U.S. Pat. No. 4,242,393, issued Dec. 30, 1980 hereby incorporated by reference in its entirety).

The technique of producing carpet tiles employing PVC plastisol is a different process in that PVC plastisol, on heating, gels and fuses, while carpet tile produced through the employment of hot melt composition provides for the heating of hot the melt composition to form a liquid hot melt composition, at least to form a tacky surface, and after contacting the fibrous backing sheet with the hot melt composition, controlled cooling. A typical method of producing carpet tile employing hot melt compositions, such as a bitumen composition, wherein the back surface of the carpet material is laid on to a precoated layer of hot melt bitumen composition is described, for example, in U.S. Pat. No. 4,582,544, issued Apr. 15, 1986, hereby incorporated by reference in its entirety. After coating of the carpet material, the carpet material is typically cut into carpet tile, generally 18 by 18 inches in the United States or 50 by 50 centimeters for the European market.

In carpet tile, it is desirable to provide a carpet tile which has good dimensional stabilities, good lay flat characteristics and further which carpet tile may be produced in an in-line production method.

SUMMARY OF THE INVENTION

The invention relates to a carpet tile and a method of producing the carpet tile. In particular, the invention concerns a carpet tile prepared from a carpet material characterized by good dimensional stability and lay flat characteristics, and a method of producing such carpet tile which provides for an in-line production of the carpet tile employing hot melt backing compositions.

The present invention relates to a carpet tile, which carpet tile comprises a carpet material composed of primary backing sheet having a fibrous face wear surface, and, for example, a tufted wear surface, and a fibrous back surface, for example a back surface of loops of the tufts, and which includes a secondary backing on the back surface of the carpet tile, and in between the primary and secondary backing sheets, at least three separate hot melt backing compositions.

The carpet tile comprises a carpet material having a first and a second and different precoat hot melt composition layer, which precoated carpet is laminated to a secondary backing sheet which exposed surface has been coated with a thick layer of a different, flexible hot melt composition layer. The carpet tile comprises a first precoating hot melt composition layer applied to the back surface of the primary backing sheet, which first precoat hot melt backing composition layer penetrates the fibrous back surface and aids in locking the fibrous back surface, such as the fibrous back loops of the tufts, to the primary backing sheet. The first precoat layer typically comprises a hot melt composition of an asphaltic or petroleum-based material, such as for example, bitumen or, more particularly, an inexpensive petroleum-type hot melt, thermoplastic resin.

The first precoat backing layer composition usually comprises a hot melt petroleum resin, such as an aromatic hydrocarbon resin or a mixture thereof, and which precoat backing is often characterized by a ring and ball range of from about 100° C. to 125° C. and, for example, 105° C. to 120° C. The precoat backing layer is generally heated to about 275° F. to 375° F. and applied to the fibrous back surface of the primary backing to penetrate and aid on solidifying in retention of the back fibers to the primary backing sheet. While the precoat backing composition may contain other ingredients and additives, the composition consists essentially of the bitumen or petroleum resin of over 90% by weight. Employment of large amounts of filler or other type ingredients or additive materials which tend to increase the viscosity or the melting point temperature or handling characteristics of the precoat backing layer composition should usually be avoided, to ensure that the precoat backing composition may be easily heated and applied to obtain good back fiber bonding properties.

The first precoat hot melt composition is applied in an amount sufficient to provide for tuft lock to the back of the fibrous backing of the primary backing sheet and typically the amount of coating would range from about 5 to 15 ounces per square yard, for example, 8 to 12 ounces.

The second or intermediate precoat layer, which is applied to the exposed surface of the first precoat layer, comprises a hot melt bitumen or bitumen-modified composition, which bitumen or bitumen-modified composition contains a small, but effective amount of a thermoplastic polymeric material to promote adhesion of the layer upon lamination, such as a vinyl-type polymer, and more particularly, an alkylene vinyl, short-chain acid polymer, and more particularly, an ethylene vinyl acetate or an ethylene ester acrylate polymer, in a small amount in order to further enhance back tuft lock where the back fibers are still exposed and provide for the easy lamination of the exposed back surface of the second precoat layer in a subsequent laminating step. Also, the addition of a small amount of the thermoplastic polymeric material, such as the ethylene vinyl acetate or acrylate polymer provides a reduction to a reasonable viscosity to the second hot melt precoat composition so that the hot melt composition may be easily applied to the first precoat composition.

The second precoat or intermediate hot melt adhesive composition applied to the exposed solid or tacky surface of the precoat backing layer normally comprises a mixture of a bitumen, blown or unblown, or a modified bitumen, together with a filler, and polymeric materials to provide for good adhesion and laminating characteristics so that the exposed surface of the intermediate coating layer may be easily laminated as a tacky surface through a hot melt backing composition on the secondary backing sheet. Generally, the intermediate hot melt backing composition comprises 10% to 70% by weight of an inexpensive, asphaltic compound, such as bitumen and a petroleum resin, for example, 20% to 50% by weight. The composition also includes a particulate filler material, more particularly a clay or limestone material dispersed in the hot melt intermediate composition in an amount generally ranging from 10% to 50% by weight, or typically 20% to 40% by weight. The intermediate composition also includes an adhesive-type polymer to promote laminating and adhesive qualities to the intermediate backing composition, and more particularly, comprises a vinyl acetate type compound, such as an ethylene vinyl acetate or an ethylene ester acrylate polymer, since the intermediate coating is usually heated to a temperature similar to the temperature of the precoat and applied over the exposed surface of the precoat and over any exposed portion of the fibrous back surface. Typically, the thermoplastic polymer material is employed in an amount sufficient to provide for the desired lamination and viscosity reduction properties of the hot melt bitumen composition, and more particularly, in an amount ranging from about 15 to 40 ounces per square yard of the carpet material, and more particularly, about 20 to 30 ounces per square yard.

A hot melt backing composition is applied to a secondary backing sheet, the exposed surface of which is subsequently laminated to the intermediate hot melt backing composition. The backing comprises a hot melt composition of bitumen or modified bitumen, for example, having properties of 10 to 25 penetration, for example, 15 to 20 penetration, and a ring and ball ranging from 95° C. to 115° C., for example, 100° C. to 110° C. The bitumen may be blown or unblown and may comprise the sole or primary constituent of the hot melt backing composition. More generally, however, the backing composition also includes a substantial amount of filler material, and more particularly, particulate calcium carbonate in an amount ranging from about 20% to 70% by weight, and more typically 30% to 65% by weight.

The hot melt backing composition may also opotionally contain a thermoplastic rubbery material to impart desired resiliency and flexibility to the solidified backing composition. The rubber polymer is present in an amount to provide desired flexibility and would range from about 2% to 15% or more by weight. The thermoplastic rubber should comprise a polymeric material having the flexibility and resilience of rubber and yet the processing ease of a thermoplastic process material. The thermoplastic rubber may comprise a wide variety of materials such as, for example, butyl or isoprene rubber, copolymers of a vinyl aromatic monomer such as styrene with a hydrocarbon diene such as a $C_4$–$C_5$ diene like butadiene or isoprene to form a block or random block copolymer, for example, of styrene-butadiene-styrene or styrene-isoprene-styrene or a thermoplastic poly alkylene like ethylene polypropylene or ethylene butylene copolymer, elastomeric urethane polymer, etc. Other thermoplastic-type modifiers include, but are not limited to: vinyl resins like ethylene vinyl ester, such as EVA, and atactic polyproplene. Optionally, but desirable, the hot melt composition may also include other asphaltic or napthenic type compounds, and more particularly, oil extenders for the rubbery polymer like a napthenic oil in an amount ranging from about 1% to 10%, e.g. 2% to 6%, by weight of the composition. Typical napthenic oils would comprise cycloalkenes, and more particularly cycloparaffins, like polymethylene hydrocarbons, which occur in petroleum, generally comprise the $C_5$–$C_6$ cycloalkenes for use as an oil extender with thermoplastic rubber though other oil extenders compatible with the thermoplastic rubber and the bitumen compositions may be employed.

The hot melt bitumen or bitumen-modified composition is applied to this secondary backing sheet in an amount ranging from about 40 to 125, but more typically, 75 to 100 ounces per square yard of the hot melt coating composition on the secondary backing sheet.

The carpet material employed contains a primary backing sheet or any combination of sheets to form a co-primary backing sheet which may be composed of numerous natural or synthetic type materials, and more particularly, may comprise non-woven polymers such as polyester or ribbon polypropylene in separate or combined sheets. The carpet material may comprise, for example, the employment of a separate glass fiber scrim or tissue sheet as a co-primary backing sheet or the primary or co-primary backing sheets may be interwoven in a woven or non-woven manner with one or more polymeric or glass fibers. The fibrous wear face of the carpet material of the primary backing sheet may be comprised of natural or synthetic fibers or mixtures thereof, but generally comprises nylon, polyester, acrylic or propylene fibers. The carpet material is formed in a variety of ways, but more typically has a tufted or needle punched face surface with tufted or needle punched back on the back surface of the primary sheet. The secondary backing sheet is mainly composed of same or similar materials as the primary backing sheet, or a different material, and more typically would comprise a non-woven polyester with or without glass fiber scrim or tissue material in combination therewith. The secondary backing sheet may typically be placed on the back surface of the carpet tile and should be of such material as to provide good lay flat and dimensional stability properties for the carpet tile. The carpet tile may be secured to a substrate flooring surface with or without the use of adhesives on the secondary backing sheet.

The hot melt coating composition employed as the three separate and distinct backing layers for the carpet tile may contain therein woven or non-woven fibrous sheets, such as tissue or scrim layers such as glass fiber tissue or scrim layers, in order to provide for additional dimensional stability or other desirable features of the carpet tile. The hot melt compositions employed and described in preparing the carpet tile may be modified and contain various amounts of other polymers and additive materials, and more particularly, antioxidants, viscosity reducers, adhesion promoters, fillers, plasticizers, flame retardants or other additive materials to impart other desirable characteristics to one or each or all of the separate layers.

The method of preparing the carpet tile of the invention comprises laminating the back surface of the first and second precoated carpet material to the surface of the backing layer on the secondary backing. The method comprises coating a hot melt backing composition onto a secondary backing sheet, which is a glass fiber, such as a secondary backing sheet composed of a non-woven sheet material, such as polyester, which serves as the back surface of the carpet material, and a glass fiber or other scrim-type sheet material, onto which the hot melt backing coating composition is coated, for example, at a temperature of 290° F. to 325° F. In a precast lamination method, the coated secondary backing sheet is then cooled and stored, such as rolled up for subsequent use in an in-line lamination production technique. In an in-line direct production method, the coated secondary backing sheet is directly used after coating in the method of producing the carpet tile, and is passed through a cooling section, such as an oven containing cooling plates, e.g. above and below the coated secondary sheet material, to provide for controlled cooling and solidification of the hot melt backing composition of the secondary backing sheet.

The carpet material is back coated with a first precoat of the hot melt backing composition in an amount generally 5 to 12 ounces per square yard, and generally at temperatures ranging from 290° F. to 340° F., and is followed by the second precoat or intermediate layer of the hot melt backing composition of bitumen and an adhesive-type binder in an amount from 20 to 30 ounces per square yard and also at a temperature ranging from 290° F. to 340° F. The back coated carpet material containing the two backing layers with the exposed surface of the intermediate backing layer being tacky is then passed through a pair nip rollers to laminate the tacky surface of the intermediate back coating layer to the exposed cold or tacky surface of the backing composition on the secondary backing sheet. In the lamination steps, sufficient pressure should be applied to the carpet material between the nip rollers to force the tacky back surface of the carpet material into a close contacting adhesive relationship with the exposed surface with the backing layer on the secondary sheet material, but insufficient to cause any lateral movement of the intermediate backing composition which may be in a semi-solid, tacky condition. Of course, if desired, the exposed surface of the backing layer of the secondary backing sheet may be preheated, such as the use of infrared heaters directed to the surface just prior to the lamination nip roller, to provide good laminating adhesion when passing through the nip rollers.

After the laminating step, the laminated carpet material is then passed through a cooling section, such as a cooling oven composed of cooling plates circulating cold water to provide the controlled cooling of the laminated carpet material; and thereafter, the cooled laminated carpet material is then slab cut, die cut or rolled up as desired, typically at ambient temperatures of 60° F. to 80° F. The secondary backing sheet material may be back coated by a variety of techniques and equipment, and the sheet may be supported or unsupported, that is, may be supported on a carrier belt or be directly back coated onto the secondary sheet material of the carpet material. The precoated carpet material may for example be prepared in a manner as set out in U.S. Pat. No. 4,582,544 by forming the backing sheet on a releasable carrier belt or strippable release sheet and then laminating the back surface of the precoat carpet material into the backing layer.

The employment of the first precoat hot melt coating composition, such as the inexpensive petroleum resin, is desirable in that such first precoat replaces or substitutes for the usual use of a latex precoat on the back surface of the carpet material. The employment of a latex precoat does not permit an inexpensive, in-line carpet production method of carpet tiles since the production method must be adopted so as to drive and remove the water from the latex prior the application of the additional hot melt composition to the back of the carpet material. The employment of a first precoat composition of petroleum resin to secure the fibrous back surface to the primary sheet together with the second precoat layer avoids the necessity of employing a latex precoat, and therefore permits the in-line production of the carpet tile.

In the method of producing the carpet tile, the secondary backing sheet is separately coated with the hot melt bitumen or bitumen-modified composition containing the thermoplastic, rubbery polymeric material which is then allowed to cool. Subsequently then, the exposed surface of the hot melt bitumen rubbery-containing material coating layer is laminated to the hot, tacky surface of the second precoat layer of the hot melt bitumen, resin-containing composition to provide for a laminated carpet tile construction. After the lamination step, the carpet material is subsequently cut into desired carpet tiles and then packaged.

The carpet tile and method of the invention avoids the necessity of employing a latex precoating on the fibrous back surface and provides for an inexpensive in-line production of a hot melt-type carpet tile and produces a carpet tile having dimensional stability and good lay flat properties.

The invention will be described for the purposes of illustration only in connection with certain embodiments; however, it is recognized that those persons skilled in the art may make various additions, changes, modifications and improvements to the carpet tile and method of production all without departing from the spirit and scope of the invention.

BRIEF DESCRIPTION OF THE DRAWINGS

FIG. 2 is a schematic, illustrated view of one method of producing the carpet tile of the invention by laminating it to a precast secondary backing sheet; and FIG. 3 is an illustrated, schematic view of another method of producing the carpet tile of the invention employing an in-line production technique.

DESCRIPTION OF THE EMBODIMENTS

Figure 1:
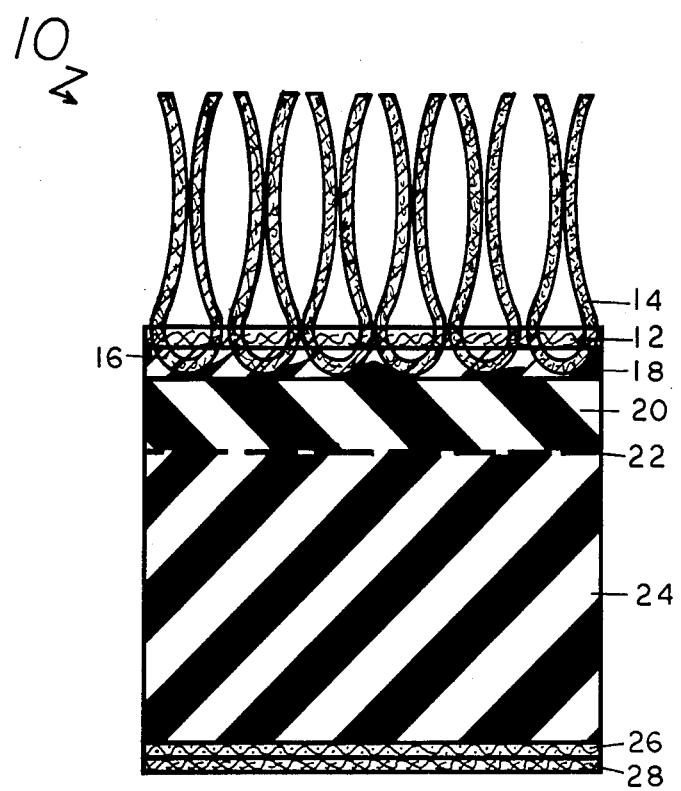
FIG. 1 is a schematic, illustrated sectional view of the carpet tile of the invention.

FIG. 1 shows a carpet tile 10 having a primary backing sheet such as 12 composed of a non-woven polyester or a ribbon polypropylene sheet which backing sheet has a fibrous face sheet 14 composed of nylon tufts to form a fibrous wear surface and having a fibrous back surface 16 composed of the back loops of the carpet 10. The carpet 10 includes a first precoat composition 18 of about 8 to 10 ounces per square yard and a second precoat or intermediate coating composition coating layer 20 of approximately 18 to 22 ounces per square yard, which hot melt coating composition layer includes a limestone filler, a bitumen, petroleum resin and an ethylene vinyl acetate polymer. The carpet 10 optionally includes a glass fiber tissue sheet 22, shown in dotted lines, and a hot melt backing coating composition layer 24 comprising a bitumen with a thermoplastic rubber polymer material generally in an amount ranging from 80 to 95 ounces per square yard, and a secondary backing sheet composed of a glass fiber scrim material 26 bonded to a secondary backing sheet which forms the exposed back surface of the carpet 28 and is composed, for example, of a non-woven polyester sheet material.

Illustrative hot melt backing coating compositions employed to prepare the carpet of FIG. 1 as shown are as follows:

| Hot Melt Backing Compositions (parts by weight) | |
| --- | --- |
| First Precoat Backing Composition | |
| 1. Petroleum resin<br>Ring and Ball 107° C.–115° C.<br>Piccovar CB20, Hercules, Inc. | 100 |
| Adhesive Second Precoat or Intermediate Backing Composition (second precoat) | |
| 1. Blown bitumen<br>15–20 penetration<br>Ring and Ball 100° C.–110° C. | 21 |
| 2. Filler - grounded calcium carbonate | 30 |
| 3. Binder mixture:<br>petroleum resin (30–50)<br>ethylene vinyl acetate (10–20)<br>and filler (20–40) | 49 |
| Secondary Sheet Backing Composition | |
| 1. Bitumen (unblown)<br>20–30 penetration<br>Ring and Ball 65° C.–75° C. | 32.8 |
| 2. Filler - limestone | 60.0 |
| SBS Block Copolymer - Thermoplastic Rubber - 100 parts and 50 parts napthenic oil (Cariflex 4203, Shell Chemical Co.) | 7.2 |

FIG. 2 is an illustrated, schematic view of the method of preparing the carpet tile of the invention using an in-line lamination technique wherein the carpet material 32 is in roll form which comprises a primary backing 12 and a back loop 16 and face tuft 14 passed over a pan and lick 34 roller containing the first precoat composition heated to a temperature of about 320° F. to provide for a first precoat coating layer on the back surface of the carpet 32 and in an amount of 8 to 10 ounces per square yard, and subsequently over a second pan and lick roller 36 containing a second precoat composition, also at about 320° F. to provide for an intermediate or second precoat backing layer on the back of the carpet material 32 in an amount of 18 to 22 ounces per square yard. A precast, preformed secondary backing sheet material 42 comprising the secondary backing sheet of FIG. 1, that is, secondary backing sheets 26 and 28 containing the solid, cold, flexible backing layer 24, is applied from roller form 42 and passed into the laminating nip rollers 38 with the exposed surface of backing sheet 24 placed against the tacky exposed surface of the second precoat layer, and the precoated carpet material and the precast material 42 laminated together. The laminated precoated carpet material is then passed through a cooling oven 40, with a temperature of from 10° C. to 80° C., which contains cooling plates, to provide for the controlled cooling of the laminated carpet material. The cooled, laminated carpet material is then cut, die cut or rolled up in area 44 typically at ambient temperatures. Optionally, where it is desired to place a stabilizing-type sheet material within the carpet backing as illustrated optionally by glass fiber scrim 22 in FIG. 1, then the glass fiber scrim may be fed in between the laminating nip rolls and between the surface of the second precoat layer and the backing surface.

FIG. 3 is directed to a schematic, illustrated direct in-line method of producing the carpet tiles 10 of FIG. 1 wherein the non-woven polyester 28 is part of the secondary backing sheet 28 and a glass fiber scrim-type material 26 also forming part of the secondary backing sheet are rolled and laid on top of one another, and the glass fiber scrim material 26 knife-coated with the hot melt backing composition 24 at about 320° F. in an amount from about 80 to 100 ounces per square yard, and subsequently cooled in a cooling oven 46 to solidify the backing layer 24. A carpet material 32 is back coated by passing the back surface over a pan and lick roller 48 containing composition 18 and subsequently back coated with the intermediate backing coating 26 in pan and lick roller 50 and the precoated carpet material 32 passed through laminating nip rollers 52 with the precoated back surface 20, which is tacky from the precoating, placed on to the solidified exposed, slightly tacky back surface 24 of the secondary backing sheet. The precoated laminated carpet is then cooled in the cooling oven 54 and subsequently slab cut in to carpet tiles, such as by slab cutting, die cutting or rolled up for cutting later.

The carpet tile produced by the method provides a relatively inexpensive carpet tile which avoids the necessity of latex precoats and provides a carpet tile with good dimensional stability, flexiblity and good lay flat properties.

What is claimed is:

1. A carpet tile, which carpet tile comprises in combination:
   (a) a fibrous face wear surface secured to a primary backing sheet, the primary backing sheet having a fibrous back surface;
   (b) a first precoat layer on the primary backing surface and comprising a hot melt bitumen or petroleum resin composition to aid in securing the fibrous back surface to the primary backing sheet;
   (c) a second precoat layer secured to the first coating layer and which second coating layer comprises a bitumen hot melt composition containing a sufficient amount of an adhesive polymer to permit lamination of the surface of the second coating layer to a third coating layer;
   (d) a third coat backing layer which comprises a bitumen hot melt composition to provide for backing layer flexibility and adhesion to the second coating layer; and
   (e) a secondary backing sheet material to provide dimensional stability to the carpet and secured to the third coating backing layer.

2. A carpet tile of claim 1 wherein the fibrous face wear surface comprises a tufted surface and a fibrous back surface comprises a tufted back loops.

3. The carpet tile of claim 1 wherein the primary backing sheet comprises a non-woven polyester sheet, a polypropylene sheet, a glass fiber scrim or tissue sheet or combinations thereof.

4. The carpet tile of claim 1 wherein the first precoat layer comprises from about 5 to 15 ounces per square yard.

5. The carpet tile of claim 1 wherein the second precoat layer comprises from 20 to 40 ounces per square yard.

6. The carpet tile of claim 1 wherein the second precoat layer comprises a bitumen hot melt composition containing from about 1% to 15% by weight of an ethylene vinyl ester or an ethylene ester acrylate polymer.

7. The composition of claim 1 wherein the second precoat layer comprises a hot melt bitumen composition which contains about 1% to 10% by weight of an ethylene vinyl acetate polymer.

8. The carpet tile of claim 1 wherein the third coat backing layer comprises from about 40 to 125 ounces per square yard.

9. The carpet tile of claim 1 wherein the third coat backing layer comprises a hot melt bitumen composition which contains from about 1% to 20% by weight of a rubbery thermoplastic polymer material.

10. The carpet tile of claim 1 wherein the secondary backing sheet comprises a non-woven synthetic fabric.

11. The carpet tile of claim 1 wherein the secondary backing sheet comprises a non-woven polyester sheet material which forms the back surface of the carpet tile.

12. The carpet tile of claim 1 which includes within the second precoat or third coat backing layers a glass fiber tissue or scrim sheet.

13. The carpet tile of claim 1 wherein the third coat backing layer comprises a bitumen hot melt composition having a rubbery thermoplastic styrene-diene-styrene block copolymer.

14. The carpet tile of claim 1 where the first precoat layer consists essentially of an aromatic petroleum resin.

15. A carpet tile which carpet tile comprises in combination:
(a) a fibrous tufted face wear surface secured to a primary backing sheet, and the primary backing sheet having a fibrous back loop-type surface;
(b) a first precoat layer on the primary backing surface in an amount of about 5 to 15 ounces per square yard and which first precoat layer consists essentially of bitumen or a petroleum resin hot melt composition to secure the fibrous back loops to the primary backing sheet;
(c) a second precoat layer on the first precoat layer in an amount of about 20 to 40 ounces per square yard and which second precoat layer comprises a bitumen hot melt composition containing from about 1% to 10% by weight of a ethylene vinyl ester polymer to permit lamination of the surface of the second precoat layer to surface of a third backing layer;
(d) a third coat backing layer in an amount of about 40 to 125 ounces per square yard, and which backing layer comprises a bitumen hot melt composition containing about 1% to 20% by weight of a rubbery thermoplastic polymer copolymer; and
(e) a secondary backing sheet material bonded to the third backing layer.

16. A method of preparing a carpet tile which method comprises:
(a) coating a secondary backing sheet material with a thick backing layer of a hot melt bitumen composition;
(b) cooling the backing layer on the secondary backing sheet to form a solid backing layer;
(c) coating a carpet material composed of a primary backing sheet containing a fibrous wear face surface and a fibrous backing surface with a first coating layer comprising a bitumen or a hot melt petroleum resin composition to aid in the securing fibrous back surface to the primary backing sheet;
(d) coating the second coating layer with a third coating layer which comprises a hot melt bitumen composition containing a small amount of an adhesive-type polymer to aid in laminating the coated surface of the coating layer; and
(e) laminating the tacky surface of the second coating composition to the surface of the backing layer;
(f) cooling the laminated material; and
(g) cutting the cooled laminated material into carpet tile.

17. The method of claim 16 which comprises storing for subsequent use the secondary backing sheet in roll form after applying and cooling the backing layer.

18. The method of claim 16 which includes:
applying a glass fiber scrim or tissue sheet material to the surface of the secondary backing sheet and casting the backing layer onto the scrim or tissue sheet material to penetrate the material and, upon cooling, bonding the scrim or tissue sheet material to the secondary backing sheet material.

19. The method of claim 16 which includes applying the first precoat in an amount of from about 5 to 15 ounces per square yard.

20. The method of claim 16 which includes applying the second precoat layer in an amount of about 20 to 40 ounces per square yard.

21. The method of claim 16 which includes applying the backing layer in an amount of about 40 to 125 ounces per square yard.

22. The method of claim 16 wherein the carpet material comprises a tufted nylon carpet material.

23. The method of claim 16 wherein the first precoat layer consists essentially of bitumenr or a petroleum resin.

24. The method of claim 16 wherein the second precoat layer comprises from about 1% to 10% by weight of ethylene vinyl acetate polymer.

25. The method of claim 16 wherein the backing layer comprises from about 1% to 20% by weight of a thermoplastic rubbery polymer to improve the flexibility of the bitumen composition and to aid in adhesion of the backing layer to the secondary backing sheet material.

26. The method of claim 25 wherein the rubbery polymer comprises a styrene-butadiene-styrene block copolymer and optionally includes an oil extender for the block copolymer.

27. The method of claim 16 which includes laminating under roller pressure a tacky surface of the second precoat layer to a solid surface of the backing layer.

28. The method of claim 16 which includes introducing a tissue or scrim material between the laminating surfaces.

29. The carpet tile produced by the method of claim 16.

* * * * *